UNITED STATES PATENT OFFICE.

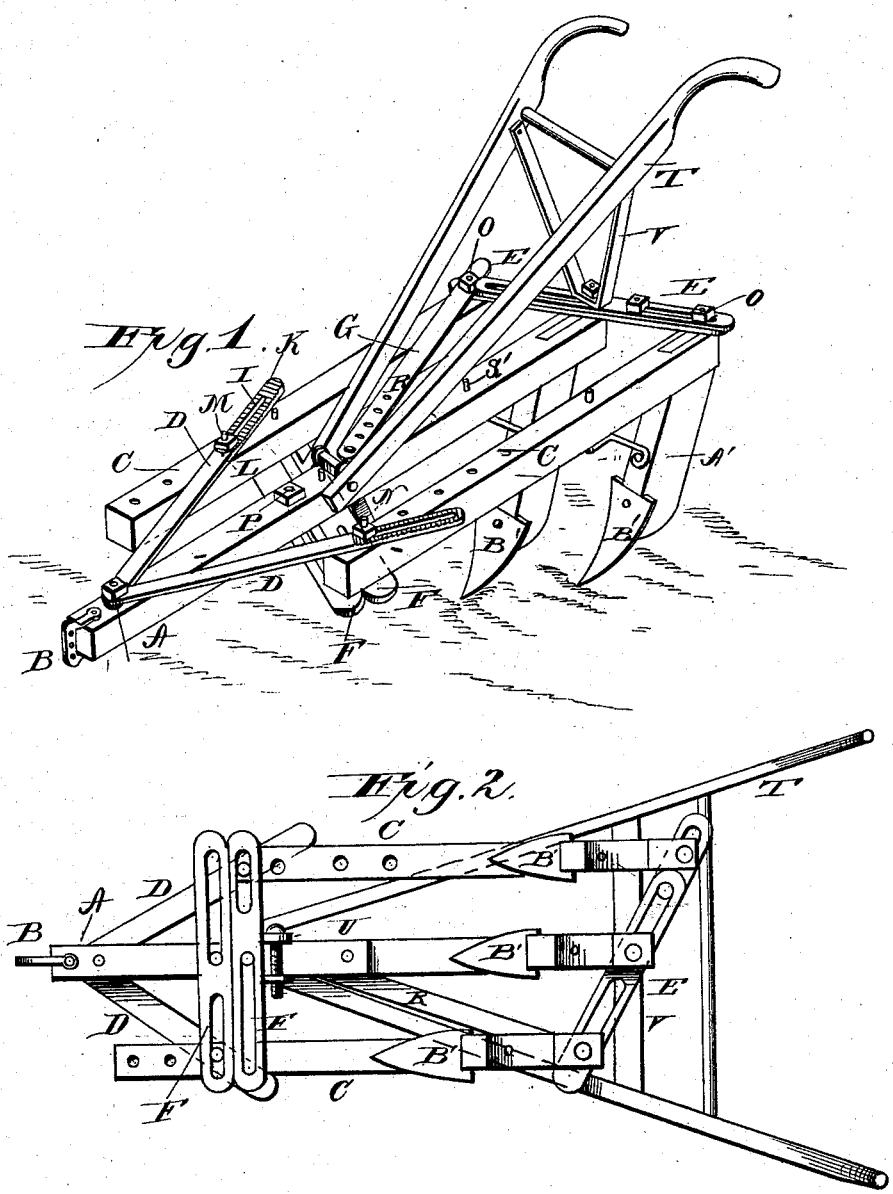

FREDERICK M. LESLIE, OF CEDAR GROVE, GEORGIA.

CULTIVATOR.

SPECIFICATION forming part of Letters Patent No. 238,132, dated February 22, 1881.

Application filed March 10, 1880. (No model.)

*To all whom it may concern:*

Be it known that I, FREDERICK M. LESLIE, a citizen of the United States, residing at Cedar Grove, in the county of Walker and State of Georgia, have invented certain new and useful Improvements in Cultivators; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to certain improvements in cultivators; and it has for its object to provide for conveniently reversing the parts of a cultivator, so that it may be adapted to cultivate either to the right or left, as may be desired, and also to provide for increasing or diminishing the distance between the plows, as occasion may require. These objects I attain by the apparatus illustrated in the accompanying drawings, in which—

Figure 1 represents a perspective view of my improvement, showing the apparatus entire; and Fig. 2, a bottom view of the same.

The letter A indicates the main beam of a cultivator, having the usual clevis, B, at its forward end, to which the draft animal or animals may be secured; and C C, two supplementary beams, located one at each side of the main beam, and attached thereto by means of the adjustable connections D D, E E, F F, and G. The connections D D are pivoted at a common point to the forward part of the main beam A, and are slotted at their rear ends, as indicated by the letter I, and provided on their upper faces with a series of teeth, K, which are adapted to be engaged and held by the toothed washers L and nuts M, secured to the bolts N, passing through apertures in the side beams, C C. A series of these apertures are formed in each beam to receive the bolts, so that by moving either of the bolts of the beams back or forth and properly securing them, the beams may be set with respect to each other to advance the plow on one and carry the plow on the other to the rear, in order to adapt the apparatus to right or left hand work.

By means of the teeth on the upper faces of the connections D D and the corresponding teeth on the washers, with the adjustable clamping-nuts, the said connections may be adjusted so as to vary the distance between the forward ends of the side beams and the main beam, as may be required.

The connections E E are slotted longitudinally, and are secured to the rear ends of the main and side beams by means of screw bolts and nuts O, whereby provision is made for advancing either side beam, and for regulating the relative distances between the respective beams.

The connections F F are slotted at each end, and are adjustably secured to the respective beams A and C by means of the bolts N, passing through the side beams, and the bolts P, passing through the main beam. These connections F F are for the purpose of holding the respective beams parallel with each other in connection with the bars D D and E E, and at the same time to permit said beams to be adjusted with respect to each other.

The connection G is connected at its rear to the rear end of one of the side beams, and at its forward end is provided with a series of apertures, R, which are adapted to engage a pin, S, on the main shaft, so as to strengthen the parts, and at the same time permit of the proper adjustment of said parts.

The letter T indicates the usual handles of the cultivator, secured at their lower forward ends to the main beam by means of a clip, U, the rear portions of said handles being provided with a bent brace, V, which is adjustably secured to the main beam by means of the bolt and screw-nut by which the rear connections are secured to said beam. The respective beams are provided with the usual plow-standards, A', to which the plows B', of any suitable pattern, are attached in the ordinary or any approved manner.

The operation of my improved cultivator will be readily understood in connection with the above description without further explanation.

I am aware that differential adjustment of the parts in devices of this class has been before practiced by arbitrary perforations and bolts; but in all such constructions the arbitrary adjustment renders adjustment at will impossible.

I am also aware that adjusting-slots have been used in various other constructions, and none such, broadly, are sought to be covered in this application.

The important features of my device are as follows: the slotted corrugated bars D I, the perforated beams C, the differentially-slotted bars F and E, arranged as shown, the perforated bar R, the beam A, and the connecting-bolts, all constructed, arranged, and combined as shown, to allow longitudinal, lateral, and differential adjustment at will.

What I claim as new is—

The beam A, standards A', and shovels, the differentially-slotted and differentially-arranged bars F and E, the serrated slotted bars D I, the perforated beams C, the perforated tie-bar R, and the connecting bolts and nuts, the whole constructed, arranged, and combined to afford longitudinal, lateral, and differential adjustment at will, as and for the purposes set forth.

In testimony whereof I affix my signature in presence of two witnesses.

FREDERICK M. LESLIE.

Witnesses:
WILLIAM B. THURMAN,
JOHN S. CANON.